Feb. 13, 1962  P. P. CASTRUCCI  3,020,806
OPTICAL VIEWING SYSTEM
Filed Oct. 10, 1957
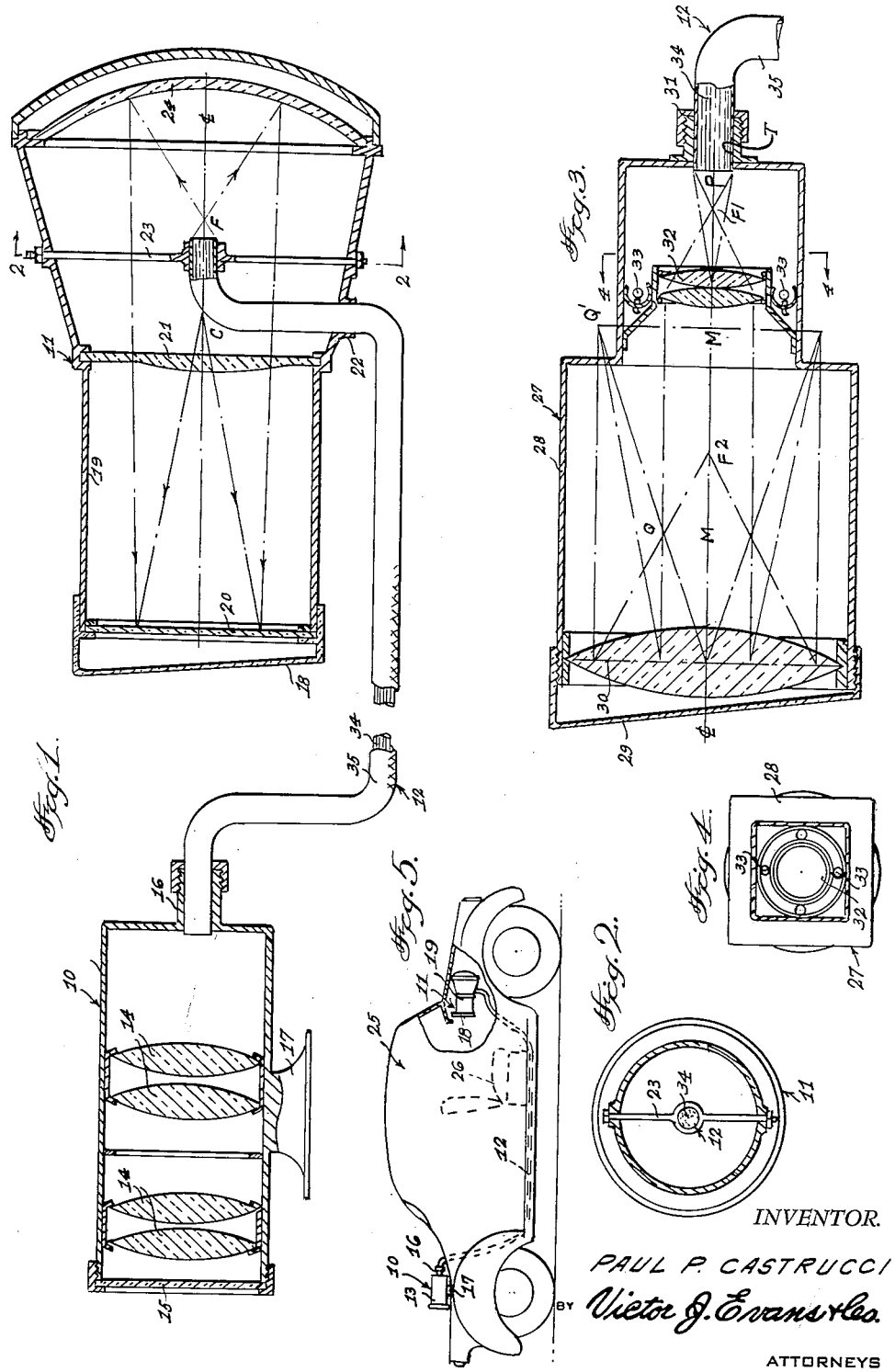
INVENTOR.
PAUL P. CASTRUCCI
BY Victor J. Evans & Co.
ATTORNEYS 3,020,806
OPTICAL VIEWING SYSTEM
Paul P. Castrucci, 180 Partridge Court, Selfridge AFB, Mount Clemens, Mich.
Filed Oct. 10, 1957, Ser. No. 689,373
1 Claim. (Cl. 88—72)

This invention relates to an optical device, and more particularly to an optical device for mounting in a vehicle so that the area to the rear of the vehicle can be conveniently observed by the driver of the vehicle.

The object of the invention is to provide an optical viewing system which is adapted to be used in lieu of the usual rear view mirror on a vehicle, and wherein the viewing system of the present invention includes an optical transmitter as well as an optical receiver, there being a means for transmitting images from the transmitter to the receiver so that the images can be conveniently observed by the driver of the vehicle.

A still further object of the invention is to provide an optical viewing system for a vehicle wherein the viewing system includes a transmitter that embodies a plurality of lenses, and wherein the viewing system further includes a receiver which is provided with a viewing screen and a reflector and a lens system, the transmitter and the receiver being interconnected together by means of an optical fiber fasciculus.

A further object of the invention is to provide an optical viewing system which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is a longitudinal sectional view taken through the viewing system of the present invention, and with parts broken away and in section.

FIGURE 2 is a sectional view taken on the line 2—2 of FIGURE 1.

FIGURE 3 is a longitudinal sectional view showing a modified receiver.

FIGURE 4 is a sectional view taken on the line 4—4 of FIGURE 3.

FIGURE 5 is a side elevational view showing a vehicle equipped with the optical viewing system of the present invention, and with parts broken away and in section.

Referring in detail to the drawings, there is shown an optical viewing system which includes an optical transmitter that is indicated generally by the numeral 10, FIGURE 1, and the numeral 11 indicates an optical receiver which is connected to the transmitter 10 through the medium of an optical fiber fasciculus.

The transmitter 10 includes a case or housing 13 which has a plurality of wide angle lenses 14 mounted therein, and a lens cover 15 is provided. The numeral 16 indicates a bushing which can be used for connecting the fasciculus 12 to the case 13, and the case 13 may be supported on a base or support member 17.

As shown in FIGURE 1, the receiver 11 includes a glare shield 18 which is connected to an end of a hollow case or housing 19, and a viewing screen 20 is arranged adjacent the shield 18. Mounted in the case 19 is an aspheric correcting lens 21, and the inner end of the fasciculus 12 is centered or connected to a jig 23. The receiver 11 further includes a spherical reflector 24.

Referring to FIGURE 5 of the drawings, the optical viewing system is shown mounted in a vehicle 25 so that for example when the driver is on the seat 26, images or objects which are to the rear of the vehicle 25 can be viewed on the receiver 11 which is adapted to be conveniently mounted adjacent the dashboard or other portion of the front of the vehicle.

Referring now to FIGURES 3 and 4 of the drawings, there is shown a modified receiver which is indicated generally by the numeral 27, and the receiver 27 is adapted to be used in lieu of or instead of the receiver 11. The receiver 27 includes a hollow case or housing 28 which has a glare shield 29 on one end thereof, and arranged adjacent the glare shield 29 is a magnifying convex lens 30. An end of the fasciculus 12 may be connected to the case 28 by means of a retaining ring 31. The numeral 32 indicates a pair of convex lenses which are combined, and these lenses 32 have illumination bulbs or lamps 33 arranged adjacent the outer periphery thereof.

The optical fiber fasciculus 12 includes a great number of flexible glass fibers 34 which are wound together in a flexible bundle and whose diameter may be of the order of 1 inch. This bundle is covered by a thin protective sheath 35. Each individual fiber 34 in the bundle is approximately a mil in diameter and is composed of a central glass core of high refractive index which is covered with a glass coating of low refractive power. The fibers are so arranged in the bundle as to maintain exactly the same pattern at the two ends.

From the foregoing, it is apparent that there has been provided an optical viewing system whereby objects can be viewed at a remote location, as for example the system of the present invention is especially suitable for use in an automobile whereby the driver of the vehicle can look at the receiver 11 which is conveniently mounted adjacent the front of the vehicle, so that images or objects to the rear of the vehicle can be observed. This is because the images to the rear of the vehicle are transmitted by the member 10 through the fasciculus 12 and these images appear on the receiver 11.

The optical transmission member 12 is composed of a plurality of flexible glass fibers 34 which are wound together in a flexible bundle whose diameter is of the order of 1 inch. This bundle is covered by a thin protective sheath 35, and each of the individual fibers 34 in the bundle is approximately a mil in diameter and is composed of a central glass core of high refractive index which is covered with a glass coating of low refractive power. The fibers are arranged in the bundle so as to maintain exactly the same pattern at the two ends.

Thus, it will be seen that the slender bundle of fibers 12 provides a fasciculus.

Furthermore, as shown in FIGURES 1 and 2 there is shown a spherical reflector-type of receiver 11, while as shown in FIGURES 3 and 4 there is illustrated a magnification receiver.

The spherical reflector receiver 11 consists of the viewing screen 20, the aspheric correcting lens 21, the optical fiber centering jig 23, the spherical reflector 24, and the sturdy case 19. The image end of the optical fiber fasciculus is located between the focus F and the center of curvature C of the spherical reflector 24. Its exact position will depend upon the amount of magnification desired or required.

In viewing the receiver 11, one may be disturbed by the way in which the fiber fasciculus cuts across the spherical reflector's optical path. However, this will produce no serious effects on the image which is formed at the viewing screen. The light which reaches each point in the image is reflected by all parts of the reflector. Thus, if part of the reflector is obscured by the fiber fasciculus, no part of the image will be missing. There will only be a decrease in the amount of light in the image.

It is well known that a spherical reflector is under corrected and will produce spherical aberration. The purpose of the aspheric lens 21 is to correct the spherical aberration. It is located at the center of curvature C of the spherical reflector and is over corrected. In this way, the marginal rays of the lens come to focus at the focal point F of the spherical reflector. The focal surface of the system is spherical, with its center of curvature at C. Thus, the image end of the optical fiber fasciculus is curved to conform with this focal surface.

The operation of the spherical reflector receiver 11 is as follows. The bright image of the rear view of the road that is formed at the receiver end of the optical fiber fasciculus 12 is gathered, reflected, and magnified by the spherical reflector and projected through the aspheric correcting lens to the viewing screen. The spherical reflector system shown is an on-axis system, but an off-axis system may be used, but the on-axis system is believed to be more efficient.

Referring to FIGURES 3 and 4 of the drawings, there is shown a magnification receiver 27 which consists of a large diameter magnification lens 30, two smaller diameter image forming lenses 32, and a plurality of illumination lamps 33 which may be optional. The magnification receiver 27 is more susceptible to bothersome aberrations than is the spherical reflector receiver. However, these aberrations can either be eliminated entirely or reduced to a tolerable level by merely using the classical optical correcting techniques such as achromatic lenses for chromatic aberration, lens shape for spherical aberration, and the like. The degree that one wishes to reduce these aberrations will primarily be determined by economic considerations.

The operation of the magnification receiver 27 is as follows. The image end T of the optical fiber fasciculus 12 enters the receiver from the rear. The combined lenses 32 are placed so that the image P from the fasciculus falls outside their focal point F1. The two lenses 32 were combined so as to provide a lens system with large power of magnification while maintaining a large diameter field of view. The image often passing through the combined lens is magnified, inverted and forms at position M along the optical axis. The magnification lens 30 is positioned along the optical axis so that the image at M will fall inside its focal point F2. This image at M now becomes the object for lens 30.

Rays emanating from a point Q on the object image at M is refracted by lens 30 but are not deviated sufficiently to come to a real focus. Instead, the rays appear to come from a point Q' in back of lens 30. This represents a virtual image because the rays do not actually pass through Q'; they only appear to come from there. The image at N as compared with the image at M is right side up and magnified. Thus, the observer looking into the front end of the receiver will see an enlarged, inverted image of the rear view image P which is present at the optical fiber fasciculus. The illumination lamps 33 are of low intensity and only serve to furnish background lighting. Their use is optional and not necessary for the operation of the receiver.

In both forms of the receiver, the observer sees an inverted, magnified image of what appears at the receiver end of the optical fiber fasciculus. In order to see the rear view of the road in proper orientation, it is important that the optical fiber fasciculus image be oriented 180 degrees out of phase with the desired viewing image orientation. Since the fiber fasciculus is flexible it is an easy matter to orient it properly. All one needs to do is simply twist the fasciculus through 180 degrees.

The actual transmitter can use any appropriate fast wide angle lens. In both forms of the receiver, the image brightness will be directly proportional to the brightness of the image that is formed by the transmitter. It is therefore important that the wide angle lens in the transmitter be fairly fast.

The parts can be made of any suitable material and in different shapes or sizes. For example the receiver may be of the order of 25 centimeters in length, while the transmitter may be about 10 centimeters in length. Also, fasciculus is extremely flexible so that for example it could be strung from the transmitter down along the frame of the car, up to the dash and connected to the receiver.

Thus, it will be seen that there has been provided an optical device so that with an optical screen or receiver mounted on a dash of the vehicle, a view of the road and traffic directly to the rear of the car can be observed. The system includes three component parts, namely, the optical transmitter, the optical fasciculus, and the optical receiver. The transmitter 10 includes the lens cover 15, the wide angle lenses 14 which are enclosed in the sturdy optical mounting tube 13. The lenses 14 can either be of a fixed focus type or the lenses can be mounted on a rack and pinion arrangement whose movement and whose focus could then be controlled from the dash of the automobile through the use of synchronous motors.

The optical receiver consists of the previously described parts and the theory of the rear view optical system is as follows. The image of the rear view of the road and traffic is collected by the lens system of the transmitter 10 and imposed on the fasciculus 12 which is connected to the back of the transmitter. All of the light entering the individual filaments of the fasciculus will be internally reflected so that each filament acts as a point image source. The image will then be transmitted via the fasciculus to the optical receiver with little loss of brightness or definition. At the optical receiver the image which is at the end of the optical fasciculus will be collected by the lens and mirror system and then viewed on the optical receiver screen.

As shown in FIGURE 5 for example the transmitter 10 can be mounted on the rear deck of an automobile and can be incorporated as an integral part of the design. Similarly, the optical receiver can be centrally mounted on the dash of the automobile for easy viewing.

With the aid of the wide angle lengs in the optical receiver, as well as the other parts, it is possible to give the driver much better vision than a conventional rear view mirror. In addition, because of the centrally mounted viewing screen, the driver will not have to shift his vision as far as he presently must in viewing the rear view mirror. Also, the rear view vision of the driver will not be obstructed by people who are sitting in the automobile.

While it has been proposed to use rear viewing electronic systems, it is believed that the present system is more advantageous than electronic systems since an electronic system would be more expensive and would increase the burden on the battery. Also, because of its electronic dynamic feature or nature, there is a strong possibility of breakdown because of burned out tubes, electric shorts and the like, whereas the present system is a static system and no electrical energy is required for its operation. Hence, the optical system of the present invention is highly stable and is reliable and is more efficient than its electronic counterpart.

I claim:

In an optical viewing system, including an optical transmitter comprising a mounting tube, a plurality of wide angle lenses mounted in said tube, said lenses being mounted in pairs, the lenses of each pair being in spaced parallel relation to each other, and the pairs being spaced from each other a greater distance than the lenses of each pair are spaced from each other, a cover mounted on one end of said tube, an optical fiber fasciculus having one end connected to the opposite end of said tube and extended from said transmitter with said end being mounted at one end of said tube in alinement with the centers of said lenses, said optical fiber fasciculus comprising a plurality of flexible glass fibers which are wound together in a flexible bundle, a thin protective sheath covering said fibers, each of said fibers comprising a central glass core of high refractive index covered with a glass coating of low refractive index, the improvement comprising an optical receiver connected to the other end of said optical fiber fasciculus, said receiver comprising a case having said optical fiber fasciculus connected thereto, a pair of convex lenses mounted in said case, the end of the fasciculus being connected to the case in alinement with the centers of convex lenses, lamps mounted in the case and arranged in a circular row that is in circumjacent relation to and laterally of the outer periphery of one of said last named lenses, a convex magnifying lens arranged adjacent the end of said case opposite to the end thereof to which the fasciculus is connected and positioned forwardly of said convex lenses, a glare shield connected to the end of said case in which the convex magnifying lens is mounted and arranged contiguous to said last named lens.

References Cited in the file of this patent

UNITED STATES PATENTS

| | | |
|---|---|---|
| 1,236,347 | Pierce | Aug. 7, 1917 |
| 1,593,786 | Worthington | July 27, 1926 |
| 1,790,086 | Boerstler | Jan. 27, 1931 |
| 2,193,217 | Allen | Mar. 12, 1940 |
| 2,375,887 | Barden | May 15, 1945 |
| 2,508,764 | Miller | May 23, 1950 |
| 2,877,368 | Sheldon | Mar. 10, 1959 |

FOREIGN PATENTS

| | | |
|---|---|---|
| 787,117 | France | June 24, 1935 |
| 179,905 | Austria | Oct. 25, 1954 |

OTHER REFERENCES

A Text Book of Physics, page 538, published by the Macmillan Co., New York, 1921, Spinney.

Nature, vol. 173, No. 4392, Jan. 2, 1954, pages 39–41.

"Transparent Fibers for the Transmission of Optica Acta," vol. 1, No. 4, Feb. 1955, pages 164–170, Hopkins et al.